(12) United States Patent
Tico et al.

(10) Patent No.: US 7,825,969 B2
(45) Date of Patent: Nov. 2, 2010

(54) IMAGE STABILIZATION USING MULTI-EXPOSURE PATTERN

(75) Inventors: Marius Tico, Tampere (FI); Mejdi Trimeche, Tampere (FI)

(73) Assignee: Nokia Corporation, Espoo (FI)

( * ) Notice: Subject to any disclaimer, the term of this patent is extended or adjusted under 35 U.S.C. 154(b) by 921 days.

(21) Appl. No.: 11/640,529

(22) Filed: Dec. 15, 2006

(65) Prior Publication Data
US 2008/0143841 A1    Jun. 19, 2008

(51) Int. Cl.
*H04N 3/14* (2006.01)
(52) U.S. Cl. .................................... 348/273
(58) Field of Classification Search ............. 348/221.1, 348/229.1, 262, 272–283; 358/512
See application file for complete search history.

(56) References Cited

U.S. PATENT DOCUMENTS

| | | | |
|---|---|---|---|
| 6,542,189 B1 | 4/2003 | Tian | |
| 7,149,262 B1 | 12/2006 | Nayar et al. | |
| 7,609,320 B2 * | 10/2009 | Okamura | 348/362 |
| 2003/0020958 A1 | 1/2003 | Bean | |
| 2006/0245014 A1 * | 11/2006 | Haneda | 358/512 |

FOREIGN PATENT DOCUMENTS

| | | |
|---|---|---|
| EP | 1 209 919 A | 5/2002 |
| WO | 00/79784 A | 12/2000 |
| WO | 01/63914 A | 8/2001 |

OTHER PUBLICATIONS

Nayar, et al., High Dynamic Range Imaging: Spatially Varying Pixel Exposures, Proceedings 2000 IEEE Conference on Computer Vision and Pattern Recognition. CVPR 2000. Hilton Head Island, SC, Jun. 13-15, 2000;XP002236923.
Narasimhan, et al., Enhancing Resolution along Multiple Imaging Dimensions Using Assorted Pixels, IEEE Transactions on Pattern Analysis and Machine Intelligence, vol. 27, No. 4, Apr. 2005.
Simultaneous Image Formation and Motion Blur Restoration Via Multiple Capture, IEEE, Zinqiao Liu and Abbas El Gamal, 2001.

* cited by examiner

*Primary Examiner*—David L Ometz
*Assistant Examiner*—Akshay Trehan

(57) ABSTRACT

The specification and drawings present a new method, apparatus and software product for image stabilization of an image taken with a fixed (i.e., pre-selected) multi-exposure pattern for at least one color channel by an image sensor of a camera, wherein a plurality of groups of pixels of the image sensor have different pre-selected exposure times for said at least one color channel. The camera can be a part of, e.g., an electronic device such as mobile phone or a portable electronic device.

21 Claims, 5 Drawing Sheets

S - short exposed pixels

L - long exposed pixels

Figure 1a

S - short exposed pixels

L - long exposed pixels

Figure 1b

1 - Normally exposed pixels
U - Under-exposed pixels
O - Over-exposed pixels

W1 - short exposure time

W2 - long exposure time

R, G, B - intermediate exposure time

IMAGE STABILIZATION USING MULTI-EXPOSURE PATTERN

TECHNICAL FIELD

The present invention relates generally to cameras or electronic devices comprising cameras and, more specifically, to image stabilization with a fixed multi-exposure pixel pattern for capturing images taken by the camera.

BACKGROUND ART

The problem addressed by image stabilization dates from the beginning of photography, and it is basically caused by the fact that any known image sensor needs to have the image projected on it during a period of time called an integration (exposure) time. Any motion of the camera and/or of the object during this time can cause a shift of the image projected on the sensor, resulting in a degradation of the final image called a motion blur.

The ongoing development and miniaturization of consumer devices that have image acquisition capabilities increases the need for robust and efficient image stabilization solutions. The requirements may include:

- Longer integration times in order to cope with smaller pixel areas that result from sensor miniaturization and resolution increase requirements;
- Longer integration times in order to acquire better pictures in low light conditions;
- Avoiding unwanted motion during the integration time when using high zoom, and/or small hand-held devices, etc.

A simple way to prevent the motion blur is to set a short exposure time for the image. However, in the absence of good illumination, such short-exposed picture will be very noisy due to various noise factors (e.g. sensor noise, photon-shot noise, quantization noise, etc.).

In order to cope with the noise one can adopt a so called "multi-frame image stabilization" solution in which multiple short exposed images are aligned and combined together in order to synthesize a single long exposed image.

Alternatively, if the exposure time of the camera is set longer, then the acquired image will be less affected by noise but it could be degraded by the motion blur due to arbitrary camera motion during the exposure time. In order to restore such an image it is necessary to have accurate knowledge about the motion that took place during the exposure time. A special case of such "single-frame image stabilization" solutions are known under the generic name "opto-mechanical image stabilizers". These stabilizers are implemented by several vendors (e.g., CANON, PANASONIC, KONIKA-MINOLTA, etc.), and they are based on moving either the optics or the image sensor in the opposite direction of the camera motion in order to keep the image projected on the sensor in the same position during the exposure time. The method copes only with camera motion being unable to correct the blur caused by moving objects in the scene. In addition, the method has also other disadvantages like: difficulty to maintain stability during longer exposure times, and inability to cope with other motion models (e.g., rotations) than translational motion. On top of these there are also size, and cost issues related with optical stabilizers for mobile devices.

Most image sensors are using the same exposure time for all pixels. However, not all image pixels are affected by motion blur at the same extent. For instance, pixels that record smooth image areas are much less affected by motion blur than the pixels localized in the neighborhood of moving object boundaries (i.e. moving edges). Also, if the camera is fixed, the motion blur can be created only by fast moving objects passing in front of the camera, and not by the static background. In such a case only the pixels that represent the image of the moving object(s) are affected by motion blur.

One approach for stabilization would be to set the exposure time of different pixels, dynamically, during image capturing, based on the actual scene content and dynamics. This approach is indeed in accordance to the fact that some image pixels are less affected by motion blur than others. However, such an approach turns out to be quite inefficient since it requires monitoring the charge of all image pixels during exposure in order to decide whether or not some motion occurs on any of them in order to stop its exposure.

DISCLOSURE OF THE INVENTION

According to a first aspect of the invention, a method comprises: capturing an image with a pre-selected multi-exposure pixel pattern by an image sensor of a camera for at least one color channel, wherein a plurality of groups of pixels of the image sensor have different pre-selected exposure times for the at least one color channel; and determining a value of each pixel of the image for the at least one color channel using a weighted combination of a value of the each pixel and values of one or more of neighboring pixels of the each pixel, wherein at least one of the one or more neighboring pixels has a different exposure time than the each pixel using a predetermined algorithm.

According further to the first aspect of the invention, the determining may comprise: calculating an interpolating value of the each pixel of the image using the value of the pixel and the values of one or more neighboring pixels; calculating a weight coefficient for the each pixel using the value, the interpolating value and different exposure times for the each pixel and for the at least one of the one or more neighboring pixels; and calculating a final value for the each pixel using the interpolating value and the weight coefficient.

According further to the first aspect of the invention, the plurality of the groups of the pixels may comprise two groups of the pixels with two different exposure times, wherein each pixel of one of the two groups is surrounded by four neighboring pixels of another of the two groups.

Still further according to the first aspect of the invention, the plurality of the groups of the pixels may comprise two groups of the pixels. Further, the two groups of the pixels may be one of: a) alternating rows of the pixels with two different exposure times, and b) alternating columns of the pixels with two different exposure times.

According further to the first aspect of the invention, the plurality of the groups may comprise three groups of the pixels with three different exposure times.

According still further to the first aspect of the invention, the multi-exposure pixel pattern may be defined separately for each color used for an image formation in the electronic device.

According still further to the first aspect of the invention, the camera may be a part of the electronic device.

According yet further still to the first aspect of the invention, the image sensor may be a complimentary metal oxide semiconductor image sensor.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of the camera or of an electronic device comprising the camera.

According to a third aspect of the invention, an apparatus, comprises: an image sensor, for capturing an image with a pre-selected multi-exposure pixel pattern for at least one color channel, wherein a plurality of groups of pixels of the image sensor have different pre-selected exposure times for the at least one color channel; and a multiple exposure combining module, for determining a value of each pixel of the image for the at least one color channel using a weighted combination of a value of the each pixel and values of one or more of neighboring pixels of the each pixel, wherein at least one of the one or more neighboring pixels has a different exposure time than the each pixel using a predetermined algorithm.

Further according to the third aspect of the invention, the multiple exposure combining module may be configured to perform the determining which may comprise of: calculating an interpolating value of the each pixel of the image using the value of the pixel and the values of one or more neighboring pixels; calculating a weight coefficient for the each pixel using the value, the interpolating value and different exposure times for the each pixel and for the at least one of the one or more neighboring pixels; and calculating a final value for the each pixel using the interpolating value and the weight coefficient.

Still further according to the third aspect of the invention, the plurality of the groups of the pixels may comprise two groups of the pixels with two different exposure times, wherein each pixel of one of the two groups may be surrounded by four neighboring pixels of another of the two groups.

According further to the third aspect of the invention, the plurality of the groups of the pixels may comprise two groups of the pixels. Further, the two groups of the pixels may be one of: a) alternating rows of the pixels with two different exposure times, and b) alternating columns of the pixels with two different exposure times.

According still further to the third aspect of the invention, the plurality of the groups may comprise three groups of the pixels with three different exposure times.

According yet further still to the third aspect of the invention, the multi-exposure pixel pattern may be defined separately for each color used for an image formation in the electronic device.

According further still to the third aspect of the invention, the image sensor may be a complimentary metal oxide semiconductor image sensor.

Yet still further according to the third aspect of the invention, an integrated circuit may comprise all or selected modules of the apparatus.

According to a fourth aspect of the invention, an electronic device, comprises: an image sensor module, for capturing an image with a pre-selected multi-exposure pixel pattern for at least one color channel, wherein a plurality of groups of pixels of the image sensor have different pre-selected exposure times for the at least one color channel; and a multiple exposure combining module, for determining a value of each pixel of the image for the at least one color channel using a weighted combination of a value of the each pixel and values of one or more of neighboring pixels of the each pixel, wherein at least one of the one or more neighboring pixels has a different exposure time than the each pixel using a predetermined algorithm.

According further to the fourth aspect of the invention, the electronic device may comprise a camera and the image sensor module and the multiple exposure combining module are parts of the camera.

According to a fifth aspect of the invention, an apparatus, comprises: sensing means, for capturing an image with a pre-selected multi-exposure pixel pattern for at least one color channel, wherein a plurality of groups of pixels of the sensing means have different pre-selected exposure times for the at least one color channel; and combining means, for determining a value of each pixel of the image for the at least one color channel using a weighted combination of a value of the each pixel and values of one or more of neighboring pixels of the each pixel, wherein at least one of the one or more neighboring pixels has a different exposure time than the each pixel using a predetermined algorithm.

According further to the fifth aspect of the invention, the sensing means may be an image sensor and the combining means may be a multiple exposure combining module.

BRIEF DESCRIPTION OF THE DRAWINGS

For a better understanding of the nature and objects of the present invention, reference is made to the following detailed description taken in conjunction with the following drawings, in which:

FIGS. 1a and 1b are schematic representations pixel patterns with two groups of short and long exposed pixels of an image sensor in the same color channel, according to embodiments of the present invention;

MODES FOR CARRYING OUT THE INVENTION

A new method, apparatus and software product for image stabilization of an image taken with a fixed (i.e., pre-selected) multi-exposure pattern for at least one color channel by an image sensor of a camera, wherein a plurality of groups of pixels of the image sensor have different pre-selected exposure times for said at least one color channel. The camera can be a part of, e.g., an electronic device such as mobile phone or a portable electronic device.

According to an embodiment of the present invention, the image stabilization can rely on the usage of the image sensor which allows different exposure times for its pixels to compensate for a motion blur which can be caused by movement of the camera and/or of the object during the exposure time.

The pixels with different exposure times can alternate according to a specific pattern (e.g., check pattern, line by line, etc.) with the exposure times pre-set before the picture is taken. This can be achieved by using, e.g., a CMOS (complimentary metal oxide semiconductor) image sensor where the pixels could be control independently, but other sensors can be used as well.

Moreover, after capturing the image, a final image can be generated (for each color) by combining the information available in the differently exposed pixels. For instance, considering only two exposure times for the image pixels, the final image can be created by weighing more the longer exposed image pixels in smooth and static image areas, and by weighting more the shorter exposed image pixels in the neighborhood of moving edges or moving non-smooth areas. In other words, instead of adapting the exposure time of each pixel to the image content (by employing a complex monitoring process of each pixel charge during the exposure), the importance of long and short exposed pixel information to the image content is adapted in an efficient post-processing operation.

Figure 2:
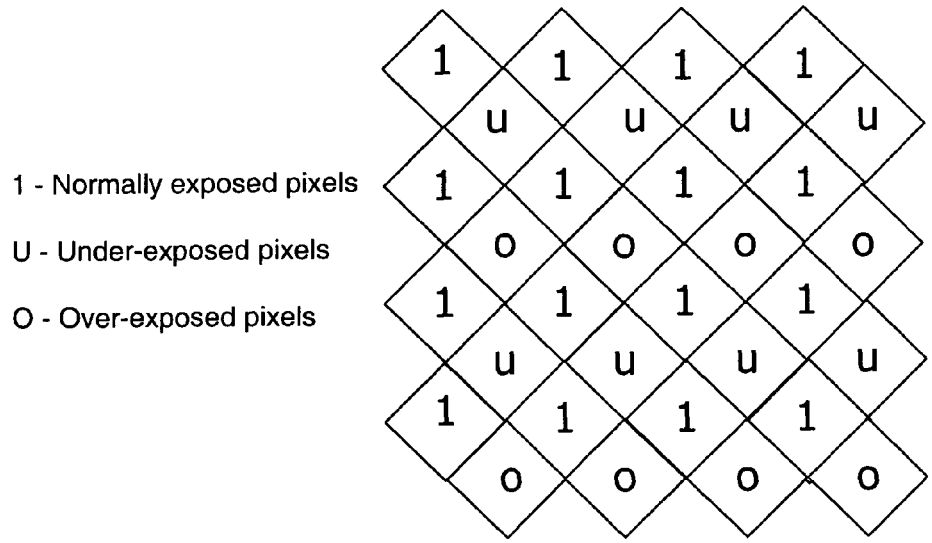
FIG. 2 is a schematic representation of a pixel pattern with three groups of the pixels (different rows) with three different exposure times of an image sensor in the same color channel, according to an embodiment of the present invention.

Furthermore, a pattern of pre-selected differently exposed pixels can be defined separately for each color channel represented in the color filter array of the camera (electronic device). Such patterns are exemplified in FIGS. 1a, 1b and 2, wherein for simplicity the same pattern is assumed to be used for each color channel. FIGS. 1a and 1b are examples among others of schematic representations of pixel patterns with two groups of short and long exposed pixels of an image sensor in the same color channel, according to embodiments of the present invention. FIG. 1a is a check pattern and FIG. 2b is alternating rows of pixels with different exposure times. Similarly, alternating columns of pixels with different exposure times can be used as well. FIG. 2 is another example among others of a schematic representation of the pixel pattern with three groups of the pixels (different rows) with three different exposure times (normally exposed, under-exposed and over-exposed) of an image sensor in the same color channel, according to another embodiment.

Figure 3:
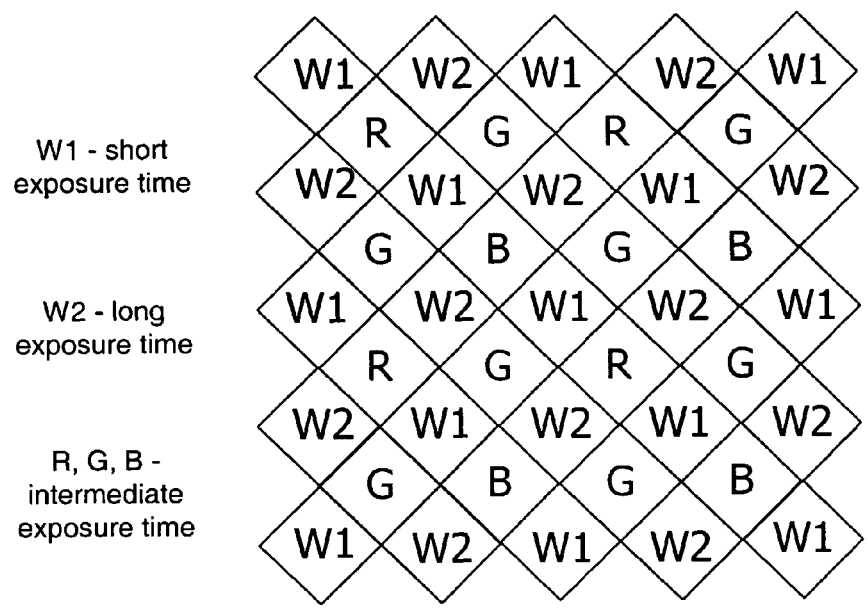
FIG. 3 is a schematic representation of a pixel pattern demonstrating different exposure times for luminance information, according to an embodiment of the present invention.

Other more complex patterns could be designed to use the lower resolution color information with respect to luminance information. FIG. 3 shows such an example among others showing a schematic representation of a pixel pattern demonstrating different exposure times (W1 and W2) for the luminance information, according to a further embodiment of the present invention.

In contrast to the arrangements shown in FIGS. 1a, 1b and 2, the arrangement in FIG. 3 may achieve a denser luminance information at the expense of lower density color information. The arrangement in FIG. 3 relies on a 4-channel color filter array including W (white), R (red), G (green), and B (blue). The white channel has higher density than the other channels and captures the luminance (brightness) information, which contains the image details information. The color channels are less dense and allow a lower resolution color information acquisition, which is in accordance with a human visual perception. Since the human eye has little color sensitivity, the accuracy of the luminance channel has a more important impact on the captured image than the accuracy of the color information. This feature of the human visual system can be used, e.g., in video formats YUV422, YUV411 and YUV420 which are all based on storing a dense luminance information (Y) along with a sub-sampled chrominance information (U,V). The pixel arrangement in FIG. 3 is in accordance to this principle and, in addition, it deals with the motion blur by using different exposure times for the pixels. Thus, the luminance information is available at three different exposures: two extreme exposures on W pixels (W1 and W2, respectively), and an intermediate exposure time in any of R, G and B pixels where the luminance can be derived by interpolation. According to this arrangement it is possible to remove the motion blur of the luminance channel by combining the information in differently exposed pixels. Then the color channels are not processed since the blur in these channels will have a little impact.

Figure 5:
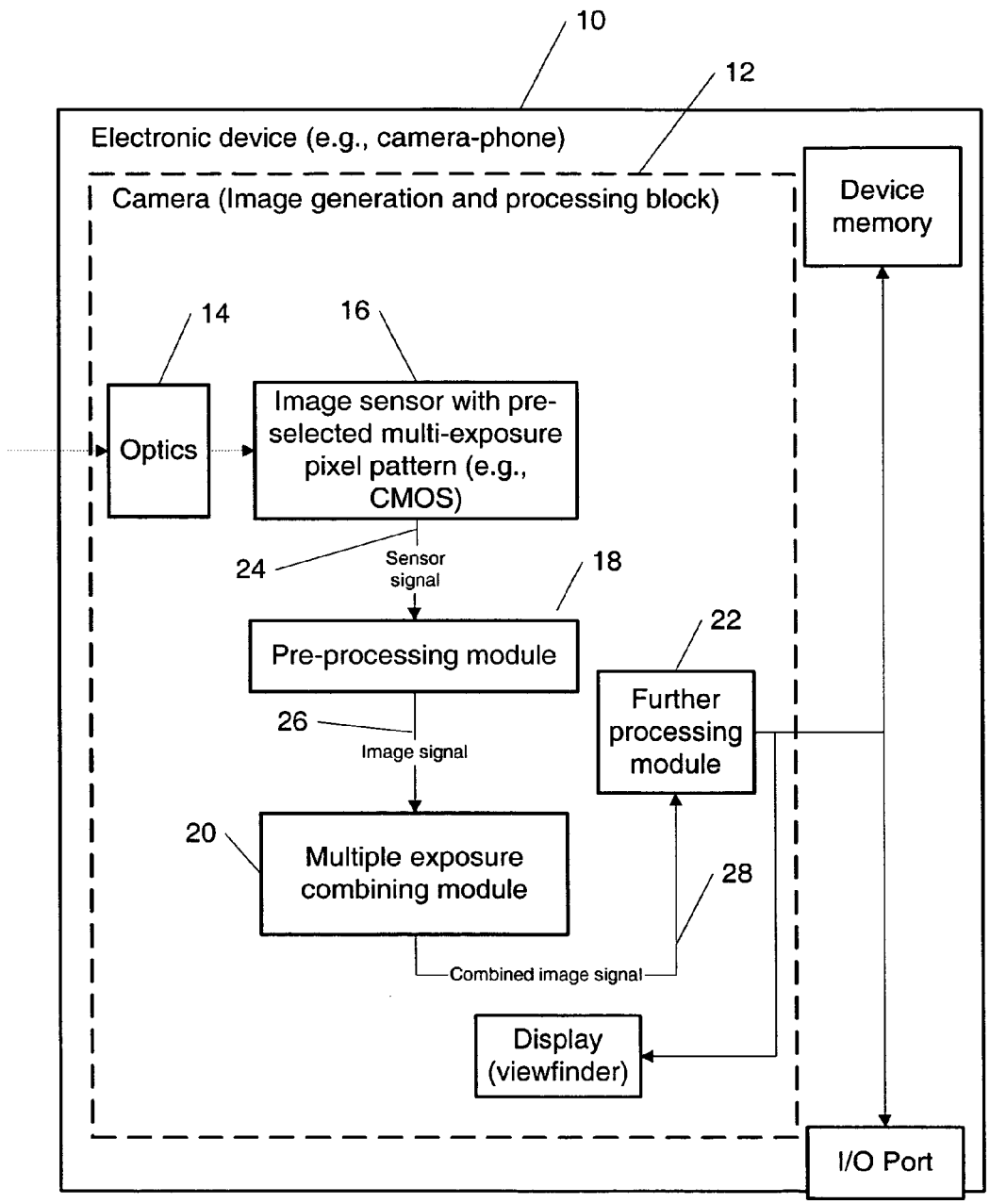
FIG. 5 is a block diagram of an electronic device comprising a camera for an image stabilization with a fixed multi-exposure pixel pattern for capturing images taken by the camera, according to an embodiment of the present invention.

It is noted that in all cases (e.g., see examples of FIGS. 1a, 1b, 2 and 3), the process of fusing the shorter and longer exposed pixel information is carried out during the image processing, preferably before the actual color interpolation operation (see FIG. 5 for more detail).

An example of implementation is described further. We assume that each pixel of the image sensor is exposed either a time $T_1$, or a time $T_2$, where $T_1 \ll T_2$. Also, the short and long exposed pixels are arranged spatially on the sensor according to a pre-established pattern like it is exemplified in FIG. 1a.

Figure 4A:
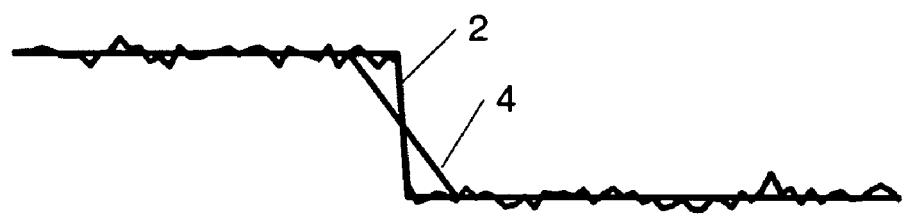
FIGS. 4a and 4b are graphs showing an image signal line crossing an edge of two pixels for a moving image: for short and long exposures (FIG. 4a) and the difference between the short and long exposures (FIG. 4b), according to an embodiment of the present invention.
Figure 4B:
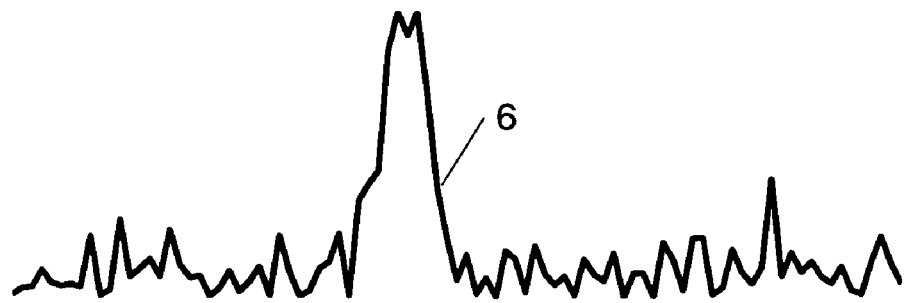

According to one embodiment, the smooth (or static) image areas can be distinguished from the moving object edges areas based on the difference between the short and long exposed pixel values as demonstrated in FIGS. 4a and 4b FIG. 4a and 4b are examples among others of graphs showing an image signal line crossing an edge of two pixels for a moving image: for short and long exposures as shown in FIG. 4a, and the difference between the short and long exposures, i.e., between the short and long exposed signal lines of FIG. 4a, as shown in FIG. 4b, according to an embodiment of the present invention. As it is exemplified in FIGS. 4a and 4b, this difference is smaller in the smooth (or static) areas, and larger in the neighbourhood of moving edges. Consequently, the long exposed pixel values are weighted more in image regions where this difference is smaller, and the short exposed pixel values are weighted more in image regions where the difference between short and long exposed pixel values is larger.

According to a further embodiment, the fusion operation between differently exposed pixels can include the following steps:

1. Interpolation;
2. Weight computation; and
3. Final image computation.

In the following, each step is described in more detail.

Interpolation.

Let $n_{i,j}$ and $b_{i,j}$ denote respectively the short exposed and the long exposed value of the pixel (i,j), wherein i and j are integers identifying coordinates of each pixel. Due to alternating pattern structure only one of the two values ($n_{i,j}$ or $b_{i,j}$) is applied to each of the pixels, depending on whether the pixel is a short or a long exposed pixel. The other value could be estimated based on similarly exposed pixels values located in the neighbourhood of the current pixel, by interpolation. There are several interpolation methods that can be used and the interpolation method described herein is only one example. According to one embodiment, e.g., bilinear interpolation can be used. In this way, using for instance a check pattern shown in FIG. 1a, the estimated long (or short) exposed value of each pixel can be calculated as the average value of its four horizontal and vertical neighbourhood pixels. For example, if a pixel (i,j) is shortly exposed, then the value $n_{i,j}$ is available in the pixels, and the value $b_{i,j}$ can be estimated as $$b_{i,j} = (b_{i+1,j} + b_{i-1,j} + b_{i,j+1} + b_{i,j-1})/4 \quad (1)$$

Weight Computation.

As described herein, we are distinguishing between the static and moving image areas based on the difference between the short and long exposed image pixels as demonstrated in FIGS. 4a and 4b. Then the weight function can be calculated based on this difference in order to emphasize the picks that correspond to moving edges and to reduce the noise present in the difference image.

In one approach, a weight image at a pixel (i,j) can be calculated as follows:

$$w_{i,j} = \exp[-\lambda(T_1|b_{i,j} - n'_{i,j}|)^2], \quad (2)$$

wherein $$n'_{i,j} = \frac{T_2}{T_1} n_{i,j},$$

T1 and T2 are values of the exposure times for short and long exposed pixels respectively, and $\lambda$ is a positive constant. The equation 2 emphasizes the picks corresponding to moving edges. In order to further reduce the noise, the weight image w can be also smoothed spatially by applying a smoothing two-dimensional filter.

Final Image Computation.

The final value of the pixel (i,j), denoted here by $f_{i,j}$, can be calculated in one scenario among others as a weighted average of the short and long exposure values of the pixel. The weight image calculated at the previous step can be adapted to the image content emphasizing the difference between the static and moving image areas. Consequently, a simple way to combine the short and long exposed pixel information is to employ a weighted average of them, e.g., as follows:

$$f_{i,j} = n'_{i,j} + (b_{i,j} - n'_{i,j}) \cdot w_{i,j}, \quad (3)$$

where $f_{i,j}$ stands for the final value of the pixel (i,j).

FIG. 5 is an example among others of a block diagram of an electronic device 10 comprising a camera 12 for the image stabilization, as described herein, with a pre-selected (fixed) multi-exposure pixel pattern for capturing images taken by the camera 12, according to various embodiments of the present invention.

The electronic device 10 can be, but is not limited to, a camera, a wireless communication device, a mobile phone, a camera-phone mobile device, a portable electronic device, non-portable electronic device, etc.

The camera 12 can comprise an optics 14 (e.g., lens, color filters, etc.) and an image sensor 16 (e.g., CMOS sensor) for capturing the image with a fixed (pre-selected) multi-exposure pattern for the at least one color channel, as described herein, to provide a sensor signal 26. A pre-processing module 18 can perform some pre-processing including but not limited to, e.g., pedestal elimination, vignetting correction, histogram analysis, pre-set gaining, etc., and then provide an image signal 26 to a multiple exposure combining module 20 which can perform steps of interpolation, weight computation and final image computation (e.g., see Equations 1-3) using differently exposed pixels in the image sensor, according to various embodiments described herein. Further, the module 20 can provide a combined image signal 28 to a further processing module 22 to perform, e.g., automatic white balance (AWB), color interpolation, contrast enhancement, noise reduction, miscellaneous corrections, etc., and then can be further provided (optionally) as an output to different modules of the electronic device 10, e.g., to a display (viewfinder) for viewing, to a device memory for storing, or to an input/output (I/O) port for forwarding to a desired destination.

According to an embodiment of the present invention, the module 18, 20, or 22 can be implemented as a software or a hardware module or a combination thereof. Furthermore, the module 18, 20, or 22 can be implemented as a separate module or it can be combined with any other module/block of the electronic device 10 or it can be split into several blocks according to their functionality. Moreover, it is noted that all or selected modules of the electronic device 10 can be implemented using an integrated circuit.

Figure 6:
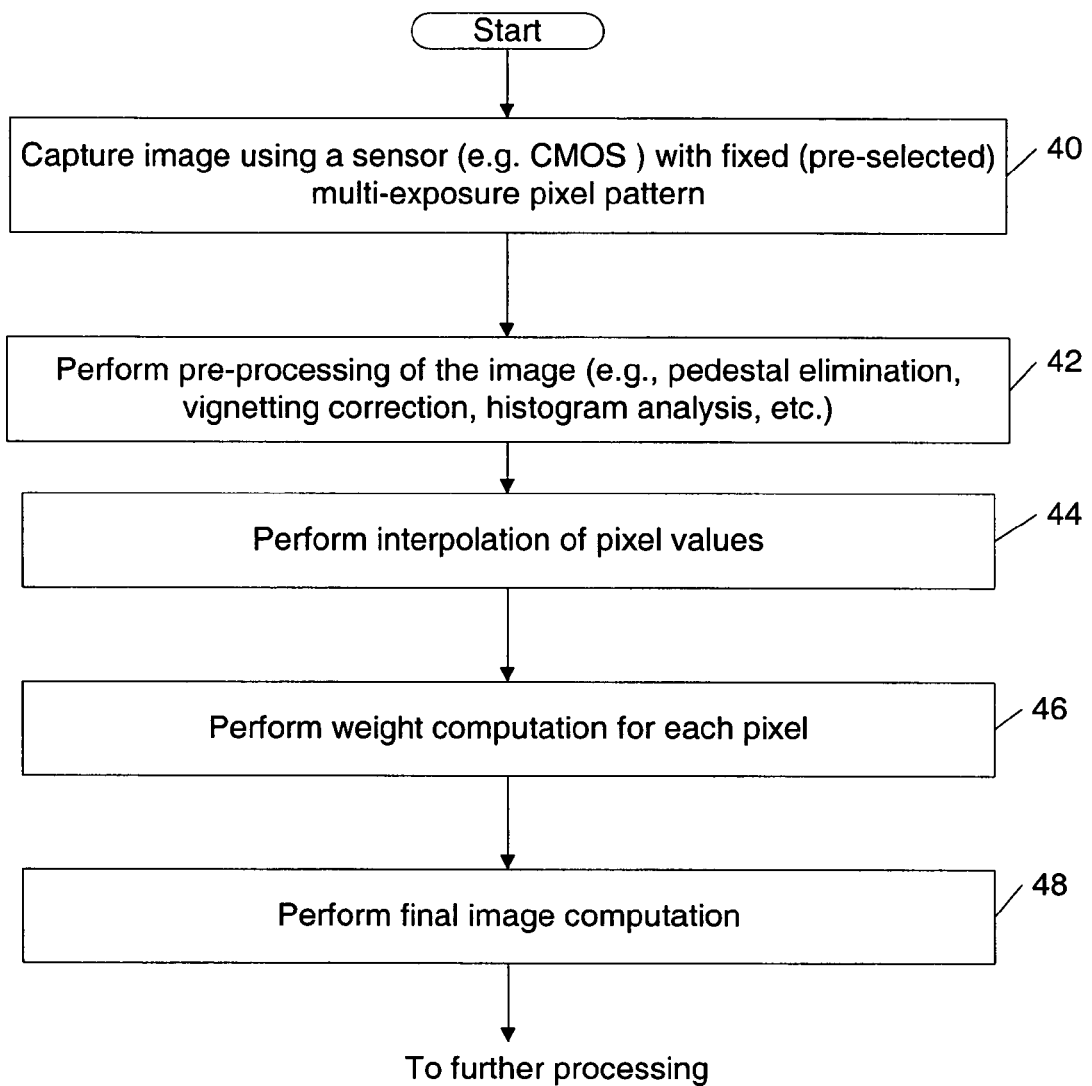
FIG. 6 is a flow chart demonstrating an image stabilization with a fixed multi-exposure pixel pattern for capturing images taken by a camera, according to an embodiment of the present invention.

FIG. 6 is an example of a flow chart demonstrating image stabilization with a fixed multi-exposure pixel pattern for capturing images taken by a camera, according to an embodiment of the present invention.

The flow chart of FIG. 6 only represents one possible scenario among others. It is noted that the order of steps shown in FIG. 6 is not absolutely required, so in principle, the various steps can be performed out of order. In a method according to the embodiment of the present invention, in a first step 40, an image is captured using a sensor (e.g., CMOS) with a fixed multi-exposure pixel pattern for at least one color channel, as described herein. In a next step 42, pre-processing of the image (e.g., pedestal elimination, vignetting correction, histogram analysis, etc.) is performed.

In a next step 44, interpolation of pixel values is performed according to the embodiment of the present invention (e.g., see the example of Equation 1). In a next step 46, weight computation for each pixel is performed according to the embodiment of the present invention (e.g., see the example of Equation 2). In a next step 42, the final image computation for each pixel is performed according to the embodiment of the present invention (e.g., see the example of Equation 3) and then forwarded to further processing.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:
    capturing an image with a pre-selected multi-exposure pixel pattern by an image sensor of a camera for at least one color channel, wherein a plurality of groups of pixels of the image sensor have different pre-selected exposure times for said at least one color channel; and
    determining a value of each pixel of said image for said at least one color channel using a weighted combination of a value of said each pixel and values of one or more of neighboring pixels of said each pixel, wherein at least one of said one or more neighboring pixels has a different exposure time than said each pixel using a predetermined algorithm;

wherein said determining comprises:

calculating an interpolating value of said each pixel of said image using said value of the pixel and said values of one or more neighboring pixels;

calculating a weight coefficient for said each pixel using said value, said interpolating value and different exposure times for said each pixel and for said at least one of said one or more neighboring pixels; and calculating a final value for said each pixel using said interpolating value and said weight coefficient.

2. The method of claim 1, wherein said plurality of the groups of said pixels comprises two groups of said pixels with two different exposure times, wherein each pixel of one of the two groups is surrounded by four neighboring pixels of another of said two groups.

3. The method of claim 1, wherein said plurality of the groups of said pixels comprises two groups of said pixels.

4. The method of claim 3, wherein said two groups of said pixels are one of: a) alternating rows of said pixels with two different exposure times, and b) alternating columns of said pixels with two different exposure times.

5. The method of claim 1, wherein said plurality of the groups comprises three groups of the pixels with three different exposure times.

6. The method of claim 1, wherein said multi-exposure pixel pattern is defined separately for each color used for an image formation in said electronic device.

7. The method of claim 1, wherein said camera is a part of the electronic device.

8. The method of claim 1, wherein said image sensor is a complimentary metal oxide semiconductor image sensor.

9. A computer program product comprising: a computer readable storage structure embodying computer program code thereon for execution by a computer processor with said computer program code, wherein said computer program code comprises instructions for performing the method of claim 1, indicated as being performed by any component or a combination of components of said camera or of an electronic device comprising said camera.

10. An apparatus, comprising:

an image sensor, for capturing an image with a pre-selected multi-exposure pixel pattern for at least one color channel, wherein a plurality of groups of pixels of the image sensor have different pre-selected exposure times for said at least one color channel; and a multiple exposure combining module, for determining a value of each pixel of said image for said at least one color channel using a weighted combination of a value of said each pixel and values of one or more of neighboring pixels of said each pixel, wherein at least one of said one or more neighboring pixels has a different exposure time than said each pixel using a predetermined algorithm;

wherein said multiple exposure combining module is configured to perform said determining which comprises of:

calculating an interpolating value of said each pixel of said image using said value of the pixel and said values of one or more neighboring pixels;

calculating a weight coefficient for said each pixel using said value, said interpolating value and different exposure times for said each pixel and for said at least one of said one or more neighboring pixels; and calculating a final value for said each pixel using said interpolating value and said weight coefficient.

11. The apparatus of claim 10, wherein said plurality of the groups of said pixels comprises two groups of said pixels with two different exposure times, wherein each pixel of one of the two groups is surrounded by four neighboring pixels of another of said two groups.

12. The apparatus of claim 10, wherein said plurality of the groups of said pixels comprises two groups of said pixels.

13. The apparatus of claim 12, wherein said two groups of said pixels are one of: a) alternating rows of said pixels with two different exposure times, and b) alternating columns of said pixels with two different exposure times.

14. The apparatus of claim 10, wherein said plurality of the groups comprises three groups of the pixels with three different exposure times.

15. The apparatus of claim 10, wherein said multi-exposure pixel pattern is defined separately for each color used for an image formation in said electronic device.

16. The apparatus of claim 10, wherein said image sensor is a complimentary metal oxide semiconductor image sensor.

17. The apparatus of claim 10, wherein an integrated circuit comprises all or selected modules of said apparatus.

18. An electronic device, comprising:

an image sensor for capturing an image with a pre-selected multi-exposure pixel pattern for at least one color channel, wherein a plurality of groups of pixels of the image sensor have different pre-selected exposure times for said at least one color channel; and a multiple exposure combiner, for determining a value of each pixel of said image for said at least one color channel using a weighted combination of a value of said each pixel and values of one or more of neighboring pixels of said each pixel, wherein at least one of said one or more neighboring pixels has a different exposure time than said each pixel using a predetermined algorithm;

wherein said determining comprises:

calculating an interpolating value of said each pixel of said image using said value of the pixel and said values of one or more neighboring pixels;

calculating a weight coefficient for said each pixel using said value, said interpolating value and different exposure times for said each pixel and for said at least one of said one or more neighboring pixels;

and calculating a final value for said each pixel using said interpolating value and said weight coefficient.

19. The electronic device of claim 18, wherein said electronic device comprises a camera and said image sensor, said multiple exposure combiner are parts of said camera.

20. An apparatus, comprising:

sensing means, for capturing an image with a pre-selected multi-exposure pixel pattern for at least one color channel, wherein a plurality of groups of pixels of the sensing means have different pre-selected exposure times for said at least one color channel; and combining means, for determining a value of each pixel of said image for said at least one color channel using a weighted combination of a value of said each pixel and values of one or more of neighboring pixels of said each pixel, wherein at least one of said one or more neighboring pixels has a different exposure time than said each pixel using a predetermined algorithm, wherein said determining comprises:

calculating an interpolating value of said each pixel of said image using said value of the pixel and said values of one or more neighboring pixels;

calculating a weight coefficient for said each pixel using said value, said interpolating value and different exposure times for said each pixel and for said at least one of said one or more neighboring pixels;

and calculating a final value for said each pixel using said interpolating value and said weight coefficient.

21. The apparatus of claim 20, wherein said sensing means is an image sensor and said combining means is a multiple exposure combining module.

* * * * *